United States Patent

[11] 3,533,460

| [72] | Inventor | Lewis Y. Kiley |
| | | Westwood, New Jersey |
| [21] | Appl. No. | 546,123 |
| [22] | Filed | April 13, 1966 |
| [45] | Patented | Oct. 13, 1970 |
| [73] | Assignee | Uniroyal, Inc. |
| | | a corporation of New Jersey |

[54] ETHYLENE—PROPYLENE—DIENE RUBBERS BONDED TO TEXTILES BY AN EPD-ISOCYANATE ADHESIVE LAYER
7 Claims, No Drawings

[52] U.S. Cl. ................................................ 152/330,
161/227, 161/190, 161/231, 161/253, 161/255,
156/110, 117/76, 117/138.8, 117/161, 260/80.78,
26/878
[51] Int. Cl. ...................................................... B60c 9/02,
B32b 27/12, B32b 27/08
[50] Field of Search ........................................... 156/110,
252, 253, 150/C; 260/33.6, 33.6A, 33.6(PO),
32.4, 29.6(EM, EMN, N), 29.7(EM, D, H), 80,
78, 878; 152/330; 117/67(T), 161(KP), 161(UIT),
138.8(F, N)

[56] References Cited
UNITED STATES PATENTS

| 2,417,792 | 3/1947 | Verbane | 161/190X |
| 3,228,793 | 1/1966 | Stemmer et al. | 117/161 |
| 3,240,649 | 3/1966 | Atwell | 156/315 |
| 3,278,333 | 10/1966 | Titzmann et al. | 117/138.8 |
| 3,364,155 | 1/1968 | Souffie | 260/4 |
| 3,385,342 | 5/1968 | Eckert | 152/330 |
| 2,625,980 | 1/1953 | Castricum | 156/128 |
| 3,027,343 | 3/1962 | Kane | 260/33.6 |
| 3,227,596 | 1/1966 | Knowles | 117/76 |
| 3,294,866 | 1/1966 | Soldatos | 260/845 |
| 3,338,769 | 8/1967 | Kuhlkamp et al. | 260/80.78 |
| 3,366,508 | 1/1968 | Gallagher | 117/138.8 |

*Primary Examiner*—John T. Goolkasian
*Assistant Examiner*—W. E. Hoag
*Attorney*—Patrick F. Bright

ABSTRACT: Sulfur-vulcanizable EPD rubbers are bonded to synthetic fibers, cords and fabrics by coating the fabric with a cement containing overmilled ethylene-propylene-dicyclopentadiene rubber and a polyisocyanate in a suitable solvent, followed by drying and curing.

ETHYLENE—PROPYLENE—DIENE RUBBERS BONDED TO TEXTILES BY AN EPD-ISOCYANATE ADHESIVE LAYER

This invention relates to a new and improved adhesive system for bonding sulfur-vulcanizable ethylene-propylene-polyene terpolymer elastomers, now known as "EPDM" rubbers, to synthetic fibers, cords, and fabrics, such as nylons and polyesters.

More particularly, the invention relates to a solvent cement containing dissolved EPDM rubber; to a fabric, fiber or cord treated with said solvent cement; to a laminate such as a tire carcass, composed of said treated fabric and an EPDM elastomer; to a tire having such a carcass; and to methods for the preparation of said compositions and articles.

The need to cause rubbers to adhere to fibers, cords and fabrics is well-known, particularly in the tire industry, and also for the construction of other articles such as hoses, belts and similar items. Many systems have been developed for satisfactorily adhering fabrics to various rubbers, but it has been found that particularly difficult problems are presented by the EPDM rubbers. Unlike natural rubber and the styrene-butadiene rubbers, EPDM rubbers exhibit a degree of chemical inertness which precludes application of conventional adhesion procedures. This inertness of the EPDM rubbers, while advantageous from many practical viewpoints, makes the solution of the bonding problem particularly difficult.

One embodiment of the present invention consists of a solvent cement which has been discovered to be particularly useful for bonding EPDM rubbers to filaments, fabrics, and cords. The said solvent cement is composed of (1) an ethylene-propylene-dicyclopentadiene rubber stock (hereinafter called "EPDCPD" stock) which has been overmilled, details of which are disclosed in a subsequent paragraph, (2) an organic polyisocyanate having at least three isocyanate groups per molecule, and (3) a solvent which is effective in dissolving both the EPDCPD stock and the polyisocyanate.

THE EPDCPD STOCK

The EPDCPD stock used in the solvent adhesive cement may be either raw, gum, black, or fully compounded. For reasons which will appear in the course of the following disclosures, it is usually preferable to make use of a fully compounded EPDCPD stock as the basis of the aforesaid cement.

EPDCPD polymers having a wide range of properties may be used in making the adhesive cements used in this invention. Useful and preferred ranges of important properties are listed below.

| Property | Usable Range | Preferred Range |
|---|---|---|
| Ethylene/propylene weight ratio | 50/50-75/25 | 55/45-65/35 |
| Iodine number | 5-30 | 10-20 |
| Mooney viscosity (ML-4 at 212° F.) | 50-100 | 70-90 |
| Gel content (insoluble in cyclohexane), percent | 0-5 | 0-1 |

Illustrative examples of EPDCPD stock compounds which may be used in the adhesive cements of this invention are shown in the following table:

TABLE I

| | Gum Stocks | | Black Stocks | | Hi-Sil Stock |
|---|---|---|---|---|---|
| EPDCPD | 100 | 100 | 100 | 100 | 100 |
| Black HiSil 233 | | | 50 | 50 | (1) |
| Zinc Oxide | 5 | 5 | 5 | 5 | 5 |
| Stearic acid | 1 | 1 | 1 | 1 | 1 |
| Mercaptobenzothiazole | 0.4 | 0.4 | | | 0.4 |
| Tetramethylthiuram disulfide | 1.2 | 1.2 | | | 1.2 |
| Sulfur | | | 1.44 | 1.44 | 1.44 |

[1] Therefore.

EPDCPD stock containing additional constituents, viz., fillers, curing agents, etc., are prepared by conventional procedures, such as Banbury and roll mill working, as fully described in U.S. Pats. No. 3,000,866 and No. 3,136,739, and British Pat. No. 880,904, the disclosures of which are hereby incorporated by reference.

After the conventional mixing, and prior to the overmilling technique hereinafter described, the compounded EPDCPD adhesive stock should have a Mooney viscosity (ML-4 at 212°F.) of at least 100. The useful upper limit of viscosity is determined only by practical processing considerations and is generally not more than 150.

SPECIAL MILLING PROCEDURE

An essential element of the present invention is the "overmilling" of the EPDCPD stock. This milling is imposed in addition to the conventional milling used for mixing stock ingredients, and is not merely the conventional expedient which is frequently employed by those skilled in the art to produce a smooth solvent cement from rubbery polymers.

Overmilling of the stock serves to render the EPDCPD rubber chemically reactive with the polyisocyanate constituent of the adhesive cement. It is readily achieved when the following conditions are satisfied: a) a continuously active bank of stock is at all times maintained in the nip of the mill during the milling procedure; b) a tightly adhering band of rubber is maintained on one of the rolls of the mill; c) a drop in Mooney viscosity of between 10 and 30 points is produced by the special milling operation. A drop of less than 10 points in Mooney viscosity is inadequate to render the EPDCPD stock reactive with respect to the polyisocyanate as required for the development of good adhesion in the practice of this invention. A drop of more than 30 points in Mooney viscosity is to be avoided since such a drop may result in a polymer which is too soft to give cured film of good strength. Additionally, it is preferred that the final Mooney viscosity be at least 70. Suitable control of the special milling operation is preferably effected by having cold water passing through the mill rolls so as to hold the stock temperature at between 100° and 200°F.

Conditions a and b of the preceding paragraph are realized as the result of underloading the mill according to usual standards. The use of conventional mill loadings results in failure to satisfy conditions a and b in the preceding paragraph and accordingly results in inadequate mastication of the stock.

Conventional mill loadings vary somewhat depending on the particular rubber employed. However, the ASTM specification for SBR may be taken as typical. According to these specifications the maximum charge for a 6-inch by 12-inch mill is four times the recipe weight, that is, the maximum charge is usually between 600 and 700 grams. In contrast, table II shows mill charges and milling periods which are suitable for the special milling procedure required in the practice of the instant invention with EPDCPD stock.

TABLE II

| Size of Mill | Conventional for SBR | The Invention Charge of Rubber Stock, grams | Milling Time, min. |
|---|---|---|---|
| 3" x 8" | | 75 | 10 |
| 6" x 12" | 600-700 | 250 | 10 |
| 16" x 42" | | 2,800 | 30 |

Overmilling may also be achieved, through not as readily, by conventional mill load by using unusually long milling times. This procedure does not mill the stock with the same measure of uniformity and generally requires a greater decrease in viscosity, e.g., a drop of at least 15 or 20 points, in order to achieve acceptable reactivity of the stock.

THE POLYISOCYANATES

The polyisocyanates used in the instant invention contain at least three NCO groups per molecule. Diisocyanates and monoisocyanates, while not harmful if present, are not effective.

Examples of polyisocyanates useful for the practice of the invention are the commercial materials known as polymethylene poly(phenylisocyanate) (also known as PAPI) which has an average of three NCO groups per molecule, and triphenylmethane triisocyanate. Other polyisocyanates which may be used are described in British Pat. Nos. 848,671 and 874,430. Additionally, the patents teach methods by which polyisocyanates may be prepared.

It is essential to the practice of the instant invention that in the adhesive cement the ratio of polyisocyanate to EPDCPD stock be adjusted to be at or above a certain threshhold level. Broadly, from 40 to 100 parts (by weight) of defined polyisocyanate for each 100 parts of EPDCPD stock should be employed. From 60 to 80 parts of polyisocyanate are preferred.

In comparison with prior adhesive compositions involving mixtures of polyisocyanates and rubbery polymers dissolved in solvents, a distinctive feature of the adhesive cement that is required for practice of the instant invention is the relatively high weight ratio of isocyanate to rubber stock. At isocyanate concentrations of less than 40 parts per 100 of EPDCPD stock the adhesive effect of the solution diminishes rapidly, while amounts in excess of 100 parts do not give any advantage over amounts in the range from 40 to 100 parts.

THE SOLVENTS

To be suitable for use in the practice of this invention the solvent must be able to dissolve both the EPDCPD and the polyisocyanate components of the adhesive cement. Solvents meeting these requirements are, for example, aromatic hydrocarbons, such as benzene, toluene and xylene; and chlorinated hydrocarbons, such as carbon tetrachloride, tetrachloroethylene, and monochlorobenzene.

PREPARATION OF ADHESIVE CEMENT

The adhesive cement is prepared by first dissolving the overmilled EPDCPD stock in the selected solvent. Thereafter the polyisocyanate is added along with such amounts of additional solvent as may be necessary to adjust the cement to the desired ultimate composition. The cement may, if so desired, be subjected to high-shear mixing in order to disperse any residual small amounts of undissolved stock.

Initial solution of the specially milled EPDCPD adhesive stock may conveniently be brought about in known manner by cutting the stock into small pieces of a size which permits gentle agitation of the solution either by stirring or shaking.

The total solids concentration in the final adhesive solution may vary widely. Generally a total solids content between 1 and 10 percent by volume is adequate for practice of the invention. The preferred level of total solids is in the range from 3 percent to 7 percent by volume. The particular solids concentration of the adhesive dip is of only secondary importance and is ultimately determined by the desired dry pickup of adhesive on the treated fabric. This pickup, expressed as the weight of cement solids retained by unit weight of fabric after drying, is preferably in the range of about 1 to 2 percent. One skilled in the art can readily choose an appropriate solids content of the cement solution required for a predetermined dry pickup.

FABRIC COATING

The cement described in the preceding section may be used by itself, or in conjunction with a subsequently described treatment, as an adhesive dip for cord or fabric. After the dipping operation, solvent is removed from the dipped cord or fabric by drying at an elevated temperature. The EPDM stock to be adhered to the cord or fabric may be molded or calendered onto the dipped and dried cord or fabric by well-known procedures. The molded or calendered assembly may then be cured by means of conventional methods.

As another embodiment of the invention it has been found that it is advantageous to give the dipped and dried cord a protective cover coating promptly, by means of a second solvent cement dipping operation, in which the cement contains an EPDCPD black stock but no polyisocyanate. The protective rubber coating left by the second dip serves to prevent deleterious effects of exposure to the atmosphere and is essential where there is a delay exceeding a few minutes between the first dipping and drying operation and the molding or calendering. These deleterious effects of the atmosphere are probably due to the interaction of atmospheric moisture with the polyisocyanates. The protective cover layer, in turn, may require protection from light and air, as explained subsequently.

A distinctive requirement for the second dip is that the EPDCPD stock which is employed therein must be compounded with reinforcing filler, such as carbon black or silica, as well as with curative agents. Compounded reinforced stock is required to develop adequate tensile strength in the coating resulting from the second dipping operation. The necessary level of tensile strength cannot be achieved in EPDCPD stock without curatives and reinforcing filler. The solvents which may be employed in the second dip are readily selected from the group defined previously. Generally, for processing convenience the same solvent as in the first dip would be employed; however, this is not essential.

In the second dip, it is preferable to have a higher solids content, viz, from 2 percent to 10 percent, but preferably from 4 percent to 7 percent, then in the first dip. Again, as in the case of the first dip, the key factor is the dry pickup of solids on the dipped fabric. As before, the wet, dipped fabric is usually wiped in order to avoid excessive wet pickup, to avoid webbing, and to obtain a uniform coating on the fabric. Wiping is particularly necessary after the second dipping step because of the high rubber content and consequent high viscosity of the solution.

While it is desirable that the twice-dipped and dried fabric should be calendered immediately following the second dipping and drying operation, it is not essential, if the fabric is stored in darkness. Darkness forestalls damage to the surface of the protective cover coating which would otherwise occur because of the combined effects of light and atmospheric air. Precautions against damage to the protective coat may also properly include carrying out all of the operations of dipping, drying and winding up, as well as subsequent storage, in darkness.

Drying conditions following the dipping steps vary with the type of fabric used. Dipped nylon is adequately dried by holding it, for example, for 3 minutes at a temperature of 320° F., whereas dipped polyester fabric requires a drying period of 3 minutes at a somewhat higher temperature, say 390°F. or higher.

Examples of commercial EPDM rubbers which may be bonded by use of this invention are "Royalene", "Nordel", "Enjay EPT", and "Dutral 270", made with cyclopentadiene dimer, 1,4-hexadiene, methylene-norbornene, and 1,5-cyclooctadiene, respectively, as the polyene. Preparative details of these rubbers are set forth in U.S. Pats. No. 2,933,480; No. 3,000,866; No. 3,063,973; No. 3,093,620; No. 3,093,621; and No. 3,136,739, in British Pat. No. 880,904; and in Belgian Pat. No. 623,698.

The fabrics which are preferably treated in accordance with this invention, include those of nylon and of polyester, for example, poly(ethylene terephthalate).

In addition to fabric forms of nylon (i.e., intralinear polyamide) and poly(ethylene terephthalate) (i.e., intralinear polyester), extended continuous surfaces of these materials, including surfaces of films and shaped solid articles made from these materials, can be adhered to EPDM rubber stocks by use of the adhesive system herein described.

The most important use of the instant invention is in the formation of carcasses for pneumatic tires. In the preparation of these carcasses it is conventional to calender (skim coat) rubber sheeting first onto one side of a fabric which has previously been covered with a coating to promote adhesion, and then onto the other side, or alternatively, to calender-coat both sides of the fabric simultaneously. Such calendering procedures are well known in the art.

The following examples illustrate the practice of the invention in greater detail.

EXAMPLE 1

Cement preparation and treatment of fabric

Compounded black stock was prepared from a raw EPDCPD polymer having the following properties:

Iodine number = 10.
Ethylene/propylene = 62/38 (by weight).
Mooney viscosity (ML-4 at 212° F.) = 77.
Intrinsic viscosity (in cyclohexane) = 2.3 at 30° C.
Gel content = 4% (insoluble in cyclohexane).

Compounding was carried out conventionally, in two steps:

Step 1: Banbury mixing:

| | Parts |
|---|---|
| Polymer | 100 |
| Black | 50 |
| Zinc oxide | 5 |
| Stearic acid | 1 |

Step 2: Mill mixing at 180° F.:

| | |
|---|---|
| Banbury mix from Step 1 | 156 |
| Mercaptobenzothiazole | 0.4 |
| Tetramethylthiuram disulfide | 1.2 |
| Sulfur | 1.44 |

Twenty-eight hundred grams of the fully compounded stock resulting from Step 2, now having a Mooney viscosity of 125, were milled with a good rolling bank for 30 minutes on a cold 16-inch × 42-inch mill. Ten refining passes through the mill were imposed at a gauge of 0.035 inch. After this overmilling the Mooney viscosity was 105, a drop of 20 points. 1,000 grams of the stock were then cut into small pieces and mixed, with gentle stirring overnight, with 24,000 grams of tetrachloroethylene to yield a cement having a total solids content of 4 percent. Further stirring with a high speed, shear-type mixer was carried out for a period of 15 minutes. This cement will be referred to as Dip #2 and serves as a protective cover coating.

5,000 grams of cement Dip #2 were mixed with 160 grams of commercial polymethylene poly(phenyl isocyanate) ("PAPI", Carwin Company, Average functionality about 3.0.) (80 parts per 100 parts of EPDCPD stock) and 12,840 grams of tetrachloroethylene, to yield a cement having a total solids content of 2 percent by weight. Further stirring with a high speed, shear-type mixer was carried out for a period of 15 minutes. This cement will be referred to as Dip #1.

The two foregoing dips were placed in the dip tanks of a unit designed for two-stage solutioning and drying of woven fabric. Automatic control devices maintained fabric tension and width. The tire cord fabric used in this example was made of type 66 nylon, two-ply yarn of denier designation 1680/2. The 18-inch wide fabric, at 22 ends per inch, required a total tension of 700—800 lbs. to prevent shrinkage under the drying conditions employed. 200 feet of such fabric were passed through Dip #1 and thence into a forced draft drying oven at 320°F. Lineal speed of the fabric was 5 feet/min., oven dwell time 3 min., and dry adhesive pickup 1 percent by weight.

The fabric was led directly from the first drying oven into the tank containing Dip #2 and thence into a second drying oven at 320°F. for a dwell time of 3 minutes. Total dry pickup from both dips was in the range 6—7 percent. The twice-dipped and dried fabric was wound on a spindle at a tension of about 50 pounds. Both the dipping and the windup operations were carried out in an enclosure which excluded light.

The package of coated fabric was wrapped in black cloth and further encased in a polyethylene bag over a two-day storage period between dipping and calendering. Skim-coating of the fabric was carried out in two stages, first on one side of the fabric and then on the other, using a carcass stock from an EPDCPD polymer having the following properties:

Iodine No. = 12.
Ethylene/propylene = 67/33.
Mooney viscosity (ML-4 at 212° F.) = 85.
Gel content = 15% (insoluble in cyclohexane).

Compounding recipe was as follows:

| | Parts |
|---|---|
| Polymer | 100 |
| Black | 72 |
| Zinc oxide | 5 |
| Stearic acid | 1 |
| Oil (naphthenic) | 40 |
| Mercaptobenzothiazole | 0.5 |
| Tetramethylthiuram disulfide | 1.5 |
| Sulfur | 2.0 |

Carcass stock was calendered to a thickness of 0.021 inch and applied to both sides of the solution-coated fabric under pressure at 180°F. so that the ultimate thickness of the skim-coated fabric was 0.055 inch. The skim-coated fabric was packaged in Holland cloth for storage prior to use in tire building.

Individual cords suitable for testing by the so-called H-test for cord adhesion were taken from the foregoing fabric after the second dipping and drying operation but before the skim-coating operation. These cords were stored in darkness until placed in the mold used for preparing H-test specimens.

The H-test has been described in "India Rubber World", pp. 213—219, May 1946. Significant tests of cord adhesion by the H-test are performed at 250°F. Adhesion is considered wholly satisfactory when the H-test results in stock failure, i.e., the unbroken cord pulls out covered with rubber stock. Such failure usually occurs in suitably compounded EPDCPD stocks when the tension exceeds 14 pounds.

Cords taken from the fabric in the present example and cured in an H-test mold required a tension of 15 lbs. at 250°F. to produce failure, which occurred wholly in the rubber. Fabric of the present example was also subjected to a stripping test, in which two pieces of skim-coated fabric are plied together and cured as a sandwich between the platens of a hydraulic press. The sandwich was subsequently pulled apart, and the tension required to produce failure was taken as a measure of the strength of the bond. Here again failure of the rubber between the fabric plies is taken to indicate an acceptable level of adhesion. Such failure occurs in EPDCPD carcass stocks at 250°F. at tensions of 20 lb./inch or higher. Stripping tension in the fabric of the present example was 25 lb./in. at 250°F.

EXAMPLE 2

In order to show the importance of the previously described overmilling procedure, cements were prepared in accordance with the procedure set forth in Example 1, except that variations in mastication procedure were employed, as set forth in Table III.

TABLE III

| Batch No. | Amount | Mixing procedure | Mooney viscosity (ML-4 at 212° F.) | Adhesive evaluation, H-250 (lbs. pull) |
|---|---|---|---|---|
| 1 | 1,200 g | 8 min. in 1,000 cc. Banbury Curatives added on 8" x 18" mill. Refine 6 end passes, 0.100" gauge, and 10 end passes, 0.030" gauge. (Conventional mixing only.) | 129 | 9.0 |
| 2A | 640 g. of No. 1 | 10 min. on 6" x 12" mill, adjusted for optimum but not necessarily adequate bank action. ¾ cuts made frequently. | 120 | 9.0 |
| 2B | 616 g. of 2A | Milling as in 2A for a further 20 min. | 114 | 12.0 |
| 2C | 592 g. of 2B | 30 min. as in 2A | 109 | 15.5 |
| 2D | 568 g. of 2C | Same as in 2A plus 10 end passes at 0.015" gauge | 109 | 16.1 |
| 3A | 250 g. of No. 1 | 10 min. on 6" x 12" mill, with active rolling bank | 117 | 14.3 |
| 3B | 226 g. of 3A | Same as 3A plus 10 end passes at 0.015" gauge | 113 | 15.0 |

The data in Table III clearly show the importance of overmilling in the practice of the instant invention. In Experiments 2A and 2B, conventional loading of the mill is used. The adhesion data obtained show that the mastication is inadequate in the time allowed, despite adjustment of the mill for optimum bank action in the nip. Experiment 2C shows that the shortcoming induced by conventional loading of the mill can be corrected by a sufficient extension of milling time. Experiment 2D shows that successive passes through a tight mill will also compensate for the deficiencies. Note, however, in these cases that the Mooney viscosity drop is 20 points before a stock is obtained which gives good adhesion. Experiment 3A shows that, at a proper mill loading which permits maintenance of an active rolling bank, a much shorter mastication interval leads to overmilling and an adequate adhesion level. Experiment 3B shows that, when adequate mastication has been achieved, no further advantage is realized by refining passes through a tight mill. Overmilling by use of an underloaded mill (Experiment 3A and 3B) is the preferred practice.

EXAMPLE 3

To show in more detail the importance of the overmilling of the EPDCPD stock, a series of experiments is described in which several different polymers were given the overmilling treatment in accordance with the invention, at a charge of 75 grams on a 3-inch × 8-inch mill for 10 minutes. Table IV-A illustrates stocks suitable for the adhesive cement, and the strip adhesion values obtained with cements made from these polymers. The preparation of the cements and the testing procedure are as described in Example 1, except that overmilling was carried out on a 3-inch by 8-inch mill at a loading of 75 grams.

TABLE IV-A

| Mooney of Raw Polymer (ML-4 at 212° F.) | Iodine Number | Mooney of Compounded Stock (ML-4 at 212° F.) | | Strip Adhesion (S-250) (lbs./inch) |
|---|---|---|---|---|
| | | Prior to Milling | After Milling | |
| 81 | 10.0 | 101 | 73 | 32 |
| 77 | 7.5 | 105 | 81 | 20 |
| 116 | 8.2 | >150 | 132 | 29 |
| 98 | 10.4 | 125 | 115 | 22 |
|  | 12.0 | 114 | 90 | 20 |

All five EPDCPD polymers in Table IV-A gave acceptably high strip adhesion values. The drop in Mooney viscosity of the corresponding compounded stocks upon cold milling varied from a minimum of 10 to a maximum of 28. The treatment and behavior of the polymers in Table IV-A fall within the preferred limits for practice of the instant invention.

EPDCPD polymers which are unsuitable for use in adhesives of the invention are shown in Table IV-B.

TABLE IV-B

| Mooney of Raw Polymer (ML-4 at 212° F.) | Iodine Number | Mooney of Compounded Stock (ML-4 at 212° F.) | | Mooney Drop | Strip Adhesion (S-250) in (lbs./inch) |
|---|---|---|---|---|---|
| | | Unmasticated | Masticated | | |
| 53 | 12 | 101 | 57 | 44 | 10 |
| 31 | 8 | 75 | 39 | 36 | 7 |
| (80-95) | (10-14) | 128 | 128 | 0 | (¹) |

¹ H-250=3 lbs.

The first two polymers failed, probably because of the low initial viscosity of the raw polymers. In such cases it is suspected that, during the cold-milling step, there was insufficient shearing action to produce the desired overmilling and reactivity of the rubber towards isocyanate.

The third polymer was from a regular commercial production run, the values in parentheses being the prescribed production specifications. This particular batch, when compounded into an adhesive stock, exhibited no change in Mooney viscosity after a 30-minute cold-milling treatment on a 3-inch × 8-inch mill at a loading of 75 gm., and as a consequence it made a poor adhesive.

EXAMPLE 4

Part I

The importance of adjusting the concentration of polyisocyanate relative to the EPDCPD stock in the adhesive dip (Dip #1) of this invention is clearly shown in Table V-A. EPDCPD gum stock, prepared as shown in column 2 of Table I, was masticated for 10 minutes on a 3-inch × 8-inch mill with a 75-gram charge. Cement made from this polymer in tetrachloroethylene was divided into several equal portions. Polyisocyanate was added to these cement samples so as to produce the indicated polyisocyanate contents per 100 parts of EPDCPD stock, and the ultimate total solids in each case was adjusted to 4 percent, by weight. Cords were dipped in these cements, dried for 3 minutes at 320°F., and H-tested, with results listed in Table V-A.

TABLE V-A

| Parts polyisocyanate (PAPI) per 100 parts EPDCPD gum stock | H-pull at 250° F. (lbs.) |
|---|---|
| 25 | 9.8 |
| 50 | 14.9 |
| 75 | 15.4 |
| 100 | 14.1 |

In Table V-A the examples in which these gum stock cements contained polyisocyanate at levels in excess of 40 parts per 100 parts of rubber gave acceptable adhesion levels, whereas the example in which the polyisocyanate content was below 40 parts gave an unacceptable level. It is also noted that polyisocyanate concentrations higher than 50, though yielding good results, do not appear to be justified because no advantage in adhesive properties over those at 50 parts is found.

Part II

Table V-B shows the effect of varying isocyanate concentration in solvent adhesive cements of EPDCPD black stock. The same milling procedure as described in Part I was used. The composition of this stock is illustrated in column 3 of Table I.

TABLE V-B

| Parts polyisocyanate (PAPI) per 100 parts EPDCPD black stock | H-pull at 250° F. (lbs.) |
|---|---|
| 30 | 12.9 |
| 40 | 14.5 |
| 50 | 16.2 |
| 60 | 16.9 |
| 70 | 18.7 |
| 80 | 17.0 |

The above table shows the importance of the ratio of isocyanate to black rubber stock. Low proportions of polyisocyanate, as, for example, 30 parts, do not render the cement adequate for application in the formation of tire carcasses, whereas proportions of 40 or more of the polyisocyanate lead to optimum adhesion values with black stock cements.

EXAMPLE 5

The difference between trifunctional and difunctional isocyanates is clearly shown in Table VI. Seven samples formulated in accordance with the procedure described in Example 1 were prepared using seven commercially available polyisocyanates. In each case in the table the polyisocyanate is present at 80 parts per 100 parts by weight of EPDCPD stock. In no case does a diisocyanate lead to adequate adhesion, and in no case does a triisocyanate lead to inadequate adhesion.

TABLE VI

| Polyisocyanate | H-250 (lb.) |
|---|---|
| Polymethylene poly(phenyl isocyanates) | [1] 15.5 |
|  | [2] 16.0 |
|  | [3] 18.3 |
| Triphenylmethane triisocyanate | [4] 14.0 |
| Bitolylene diisocyanate | 4.5 |
| 4,4'-diphenylmethane diisocyanate | 5.5 |
| Toluene diisocyanate | 4.1 |
| Hexamethylene diisocyanate | 6.2 |

[1] PAPI, Carwin Company.
[2] Mondur MR, Mobay Chemical Co.
[3] Suprasec, U.S. Rubber Co.
[4] Mondur TM, Mobay Chemical Co.

EXAMPLE 6

Four two-ply all-EPDCPD tires were made with nylon tire cord fabric treated by the method detailed in Example 1, through and including the calendering operation. These tires were of standard two-ply design and were built on a conventional drum by methods well known to those skilled in the art. Carcass plies were laid onto a liner made of butyl rubber, with a cord angle of 60° relative to the drum axis. All other parts of the tire, including tread, sidewall, etc., contained variously formulated EPDCPD rubber stocks. Splice and joint surfaces were freshened by brushing with a solvent cement containing dissolved EPDCPD black stock and tackifying agents. Tires were cured in a 7.50-inch × 14-inch Bagomatic press, with a shell temperature of 314°F. and hot water in the bag at 365°F., for 21 minutes. Then followed a cooling cycle for 4 minutes, with water at 175°F. in the bag. The cured tires were post-inflated at 35 pounds per square inch for 25 minutes.

Three of the above tires were tested on a cleated wheel and run slightly overloaded (1,264 pounds, 116 percent of standard load) at a speed of 45 miles an hour. Two of these tires ran for over 150 hours and were removed from the test unfailed. The third tire developed a groove crack at 55 hours and failed by tread separation at 115 hours. No evidence of cord failure or cord adhesive failure was discovered in any one of these tires.

A fourth tire built in exactly the same way was tested on the so-called smooth wheel. Test conditions for this tire included severe underinflation (13 p.s.i., 54 percent of standard inflation) and overloading (1,373 pounds; 126 percent of standard load). This tire also ran in excess of 150 hours and was removed unfailed and without any evidence of cord adhesive failure.

The performance of these tires in wheel tests is regarded as satisfactory and is superior to that of similar tires in which the cord adhesive was conventional resorcinol-formaldehyde rubber latex adhesive.

EXAMPLE 7

The following adhesive cements were applied to poly(ethylene terephthalate) polyester tire cord (Dacron Type 52, yarn denier 1100/2), and the efficiency of the treatment was demonstrated by the preparation and testing of H-samples, using the EPDCPD carcass stock of Example 1. As pointed out previously, drying of dipped polyester fabric or cord must be carried out at a higher temperature then that used with polyamide fabric or cord in order to obtain optimum adhesion to EPDM rubber stock in the practice of the instant invention. The advantage of higher drying temperatures for polyester cord is shown in Table VII, in which H-test data at 250°F. on cord dipped in the cement denoted as Cement A are shown.

Cement A:
EPDCPD stock (Table I, col. 3), parts—100.
Polymethylene poly(phenyl isocyanate), parts—80.
Tetrachloroethylene to give 4% total solids (by weight).

TABLE VII

| Drying Conditions | H-250 (lb.) |
|---|---|
| 3' at 320° F | 9.7 |
| 1' at 410° F | 14.2 |

Adhesion to polyester cord is improved somewhat by predipping the cord in a solution of polyisocyanate before treatment with the EPDCPD stock isocyanate dip. By this procedure, using, for example, a predip in a 3 percent (by weight) solution of polymethylene poly(phenyl isocyanate) in methyl isobutyl ketone and drying for 1 minute at 410°F., followed by a dip in Cement A and drying for 1 minute at 410°F., the H-250 value obtained was 16.3 pounds.

The method and solvent cement system of this invention are applicable to polyester as well as to nylon tire cord fabrics. In the manufacture of tires containing polyester tire cord fabric a necessary condition is that the coated fabric, after treatment with either the one-coat or two-coat adhesive cement system, must be dried at a higher temperature than that used for the nylon. A suitable drying temperature for polyester tire cord fabric is about 390° to 450°F. The curing cycle for a tire containing polyester cord fabric is the same as that for a tire containing nylon cord fabric.

EXAMPLE 8

Comparison of EPDCPD and other EPDM rubbers in solvent adhesive cements

The superior merit of EPDCPD relative to other commercially available EPDM rubbers in the formation of an adhesive cement is demonstrated by the data in Table VIII. These rubbers are distinguished by the different dienes with which ethylene and propylene are interpolymerized in their manufacture. Each of the rubbers was incorporated into a solvent adhesive cement (containing polyisocyanate), and into a solvent cover cement (containing no polyisocyanate), according to the directions detailed in Example 1. Nylon cords (denier 1680/2) were dipped and dried in these cements as in Example 1 and were then cured in a EPDCPD carcass stock confined in an H-mold. Formulation of the carcass stock was as described in Example 1.

TABLE VIII

| Termonomer | H-250 (lbs.) |
|---|---|
| Methylene norbornene | 7.5 |
| 1,5-cyclooctadiene | 7.5 |
| 1,4-hexadiene | 5.0 |
| Do | 8.0 |
| Do | 8.0 |
| Dicyclopentadiene | 16.0 |

I claim:

1. A coated textile fabric having good adhesive properties in respect to EPDM rubbers which comprises: a nylon or polyester textile fabric; a uniform coating of an admixture of overmilled ethylene-propylene-dicyclopentadiene rubber said rubber having a Mooney viscosity not less than 70 units after having been overmilled sufficiently to cause a drop in Mooney viscosity of between 10 and 30 units and from 40 to 100 parts by weight, per 100 parts of said rubber, of an organic polyisocyanate having at least three isocyanate groups per molecule, said coating comprising from 1 to 5 wt.-percent of said coated fabric.

2. The coated textile fabric of claim 1 wherein said coating is uniformly covered with a second coating containing a reinforced ethylene-propylene-dicyclopentadiene rubber free of isocyanate.

3. A laminated article comprising the twice-coated textile fabric of claim 2 and an EPDM rubber sheet.

4. A tire carcass which comprises the twice-coated textile fabric of claim 2 between and adhered to two sheets of EPDM rubber.

5. A fabric-reinforced tire having a carcass as defined in claim 4.

6. The coated textile fabric of claim 1 wherein said textile is nylon.

7. The coated textile fabric of claim 1 wherein said textile is a polyester.